United States Patent
Caldwell et al.

(10) Patent No.: US 8,083,274 B2
(45) Date of Patent: Dec. 27, 2011

(54) ELECTRO-MAGNETIC RELEASE MECHANISM

(75) Inventors: Niall Caldwell, Edinburgh (GB); Fergus R McIntyre, Edinburgh (GB)

(73) Assignee: Artemis Intelligent Power Limited, Edinburgh (GB)

( * ) Notice: Subject to any disclaimer, the term of this patent is extended or adjusted under 35 U.S.C. 154(b) by 860 days.

(21) Appl. No.: 11/995,393

(22) PCT Filed: Jul. 13, 2006

(86) PCT No.: PCT/GB2006/002600
§ 371 (c)(1), (2), (4) Date: Jun. 19, 2008

(87) PCT Pub. No.: WO2007/007109
PCT Pub. Date: Jan. 18, 2007

(65) Prior Publication Data
US 2008/0258484 A1     Oct. 23, 2008

(30) Foreign Application Priority Data
Jul. 13, 2005   (GB) .................................. 0514373.0

(51) Int. Cl.
*E05C 19/00* (2006.01)
*E05C 19/16* (2006.01)

(52) U.S. Cl. .......... 292/252; 292/251.5; 70/276; 24/303
(58) Field of Classification Search ............... 292/251.5, 292/252; 70/276; 24/303
See application file for complete search history.

(56) References Cited

U.S. PATENT DOCUMENTS

| | | | | |
|---|---|---|---|---|
| 3,753,316 A | * | 8/1973 | Savarieau et al. | 49/31 |
| 4,071,271 A | * | 1/1978 | Bourrie et al. | 292/201 |
| 4,320,914 A | * | 3/1982 | Simon | 294/82.28 |
| 4,586,425 A | * | 5/1986 | Redman et al. | 91/45 |
| 4,601,502 A | * | 7/1986 | Van Dyke | 292/252 |
| 4,807,454 A | * | 2/1989 | Sengupta et al. | 70/277 |
| 5,771,742 A | * | 6/1998 | Bokaie et al. | 74/2 |
| 5,788,402 A | | 8/1998 | Banda et al. | |
| 6,948,685 B2 | * | 9/2005 | Hawthorne | 244/129.1 |
| 7,125,058 B2 | * | 10/2006 | Hawthorne | 294/82.28 |

FOREIGN PATENT DOCUMENTS

| | | |
|---|---|---|
| DE | 3606458 A1 * | 9/1987 |
| DE | 43 07 963 | 9/1994 |
| DE | 101 08 882 | 9/2002 |
| WO | 2005/085014 | 9/2005 |

* cited by examiner

*Primary Examiner* — Carlos Lugo
(74) *Attorney, Agent, or Firm* — Stephen H. Eland; Dann, Dorfman, Herrell & Skillman

(57) ABSTRACT

An electro-magnetic mechanism comprises a spring-operated rod (1) having a recess (1a) and a latching member (2) engageable in the recess to block motion of the rod. A release member (4) retains the latching member engaged in the recess (1a) in a first position of the release member and allows the latching member to be disengaged from the recess in a second position of the release member (4). A magnet (5) retains the release member in the first position and the mechanism includes an element such as a spring (7) for urging the release member (4) to the second position. A coil (8) is arranged to demagnetize the magnet (5) at least such that the release member moves to the second position, the latching member (2) is disengaged from the recess (1a) and the rod (1) moves axially by spring force.

9 Claims, 1 Drawing Sheet

ELECTRO-MAGNETIC RELEASE MECHANISM

PRIORITY APPLICATIONS

This application is a 371 application of International Application No. PCT/GB2006/002600 filed Jul. 13, 2006, which claims priority to United Kingdom Patent Application No. 0514373.0 filed Jul. 13, 2005. Each of the foregoing applications is hereby incorporated herein by reference.

BACKGROUND TO THE INVENTION

This invention relates to an electro-magnetic release mechanism for a spring-operated rod.

Resettable mechanisms, such as pedestrian protection systems on motor vehicles, require extremely fast response times.

SUMMARY OF THE INVENTION

It is an aim of the invention to provide an electro-magnetic release mechanism for a spring-operated rod in which the time delay between an electronic actuation pulse and the release of the rod is minimised.

According to one aspect, a release mechanism is provided, which includes a rod and a latching member operable to impede motion of the rod. The mechanism further includes a release member operable between a first position and a second position. In the first position, the latching member engages the rod; in the second position, the release allows the latching member to be disengaged from the rod. A biasing element urges the release member toward the second position, and a magnet retains the release member in the first position. A magnetic flux element applies a magnetic flux opposed to magnetic flux exerted by the magnet so as to reduce net magnetic flux at least such that the release member moves to the second position, so that the latching member is disengaged from the recess to allow the rod to move axially by spring force.

BRIEF DESCRIPTION OF THE DRAWING

The invention will now be described in more detail, by way of example only, with reference to the accompanying drawing, the single FIGURE of which is a schematic section view of a mechanism according to an embodiment of the invention.

DETAILED DESCRIPTION OF PARTICULAR EMBODIMENTS

Figure 1:
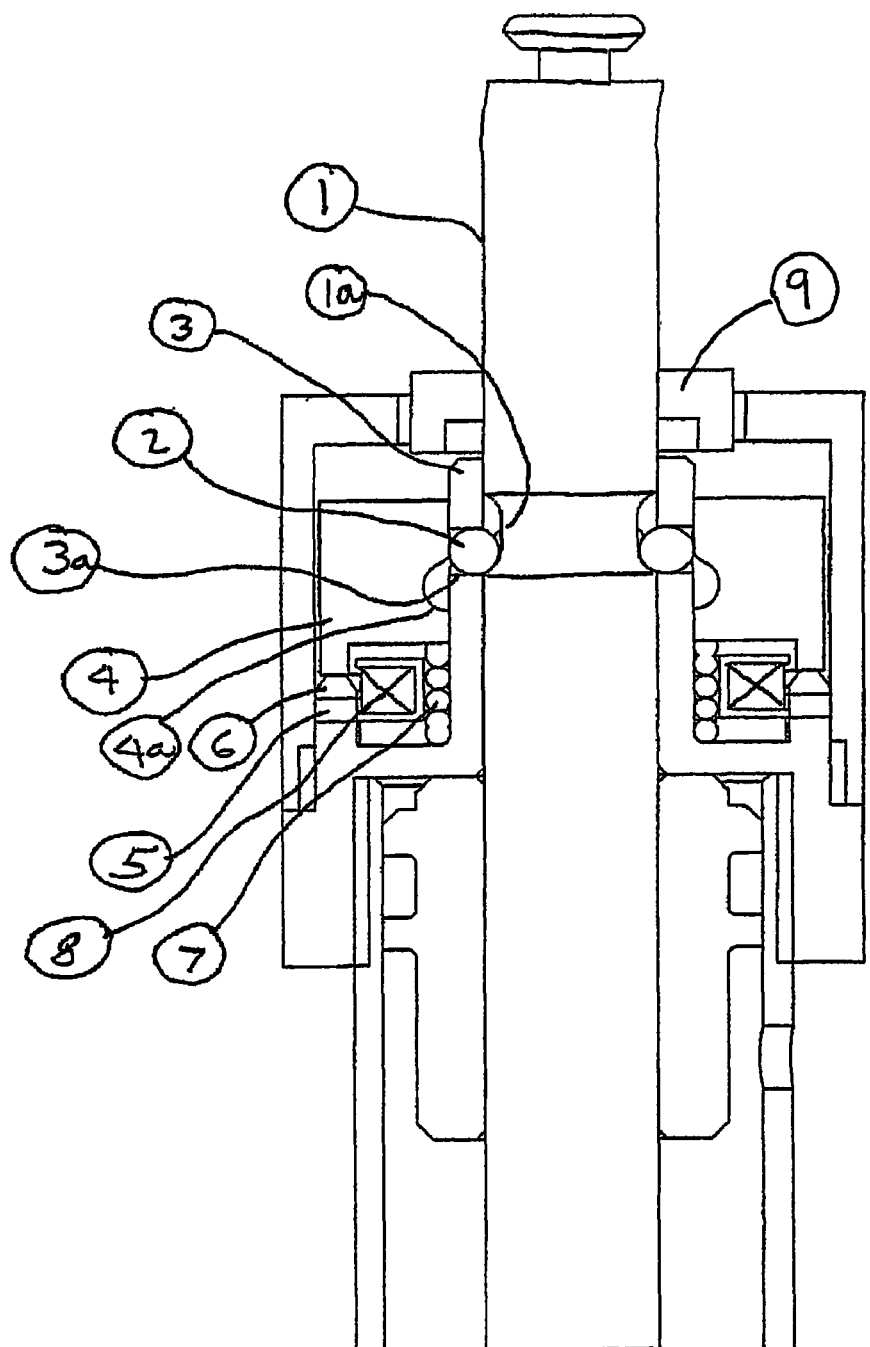

As shown in the drawing, a spring actuated rod 1 with an annular groove 1a is held compressed position by a ball, or balls, 2 acting between the groove and a reaction tube 3, where the balls reside in transverse holes 3a. The groove 1a is profiled so that there is a net radial force on the balls which, in the locked position, is resisted by an annular release collar 4a so that the balls are retained in such a position that they pass the axial load from the rod into the reaction tube.

The annular release collar has an internal profile 4a which, once the collar moves axially, allows the balls to move radially outward and so disengage the groove 1a and release the spring-operated rod.

In the locked position the annular collar is held by a magnetic circuit in which flux is driven by a permanent magnet 5, passes through the flux concentrator 6, the annular release collar 4 and the reaction tube 3, so that it returns to the other pole of the permanent magnet to complete the circuit. All of these parts are made of ferromagnetic material to reduce the reluctance. The force generated between the flux concentrator ring and the annular release collar is sufficient to retain the collar and keep the mechanism locked despite the influence of a mechanical spring 7 which is compressed and acting to push the collar into the release position.

By applying a current to the coil 8, the magnetic flux in the magnetic circuit is reduced to the point where the magnetically induced force between the collar and the flux concentrating ring is less than that of the charged spring 7. At this instant the annular release collar will accelerate and move to the release position. Once the release collar has completed its axial motion, the balls will be propelled radially outward by the radial component of force from the groove edge on the rod. The rod will then be able to translate under the influence of its spring energy.

The mechanism is reset by depressing the rod. A relatching collar 9, rigidly attached to the rod 1, moves the release collar 4 back to the locked position shown in the drawing, so that the balls 2 re-engage with the groove 1a and so the release collar 4 compresses the spring 7 and once again is retained by the permanent magnet circuit.

A variant of this design is to use the rod spring to drive the release collar by means of using a more complex profile 4a on the internal bore of the annular release collar so that in the locked position the balls exert a force on the spring collar opposing that of the permanent magnet. In this manner is possible to eliminate the spring 7 while also reducing the number of actions during the resetting.

The term "spring" as used in this description and the appended claims includes a gas spring.

The invention claimed is:

1. A mechanism comprising a rod operated by a rod spring and having a recess, a latching member engageable in the recess to block motion of the rod, a release member retaining the latching member engaged in the recess in a first position of the release member and allowing the latching member to be disengaged from the recess in a second position of the release member, the release member being formed as a collar surrounding the rod and slidable with respect thereto and having a release recess for receiving the latching member in the second position of the release member, a magnet for retaining the release member in the first position, a biasing element for urging the release member to the second position, an annular member through which the rod is arranged to move, the annular member including a through-hole containing a part of the latching member, and an element configured to apply a magnetic flux opposed to a magnetic flux exerted by the magnet so as to reduce net magnetic flux at least such that the release member moves to the second position, the latching member is disengaged from the recess and the rod moves axially by spring force.

2. A mechanism according to claim 1, wherein the latching member is in the form of a sphere.

3. A mechanism according to claim 1, having a plurality of latching members.

4. A mechanism according to claim 1, wherein the recess forms an annular groove extending around the rod.

5. A mechanism according to claim 1, wherein the element for applying magnetic flux comprises a coil through which an electric current can flow.

6. A mechanism according to claim 1, wherein the biasing element comprises a spring.

7. A mechanism according to claim 6, wherein the spring is arranged to act on the release member.

8. A mechanism according claim 1, wherein the rod carries a projection and movement of the rod in a direction against said spring force causes the projection to move the release member from the second position to the first position.

9. A mechanism comprising a rod operated by a rod spring and having a recess, a latching member engageable in the recess to block motion of the rod, a release member retaining the latching member engaged in the recess in a first position of the release member and allowing the latching member to be disengaged from the recess in a second position of the release member, the release member being formed as a collar surrounding the rod and slidable with respect thereto and having a release recess for receiving the latching member in the second position of the release member, a magnet for retaining the release member in the first position, an annular member through which the rod is arranged to move, the annular member including a through-hole containing a part of the latching member, and an element configured to apply a magnetic flux opposed to a magnetic flux exerted by the magnet so as to reduce net magnetic flux at least such that the release member moves to the second position, the latching member is disengaged from the recess and the rod moves axially by spring force, wherein the release recess includes a formation for transmitting axial force from the rod to the release member via the latching member.

* * * * *

UNITED STATES PATENT AND TRADEMARK OFFICE
CERTIFICATE OF CORRECTION

| | | |
|---|---|---|
| PATENT NO. | : 8,083,274 B2 | Page 1 of 1 |
| APPLICATION NO. | : 11/995393 | |
| DATED | : December 27, 2011 | |
| INVENTOR(S) | : Caldwell et al. | |

It is certified that error appears in the above-identified patent and that said Letters Patent is hereby corrected as shown below:

ON THE TITLE PAGE:

Item (73) Assignee: should read, Multimatic, Inc., Ontario (CA)

Signed and Sealed this
Thirteenth Day of March, 2012

David J. Kappos
*Director of the United States Patent and Trademark Office*